April 25, 1961  JYUN-ICHI GOTO  2,981,486
LOW PRESSURE FLOUR MILL
Filed Dec. 10, 1957

Jyun-ichi Goto
INVENTOR.

BY Wenderoth, Lind & Ponack
ATTORNEYS

FIG. 3
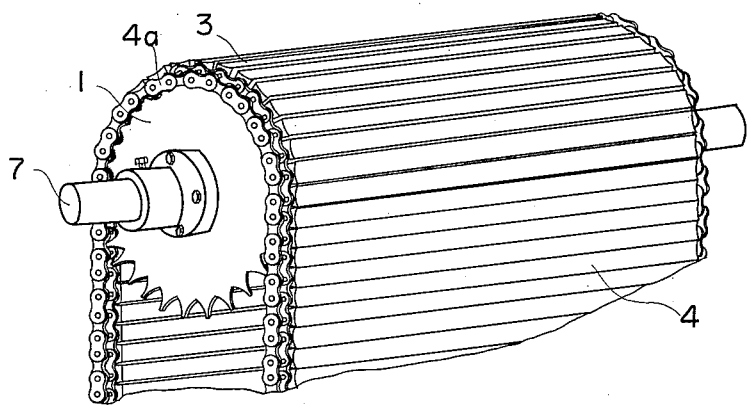
FIG. 7
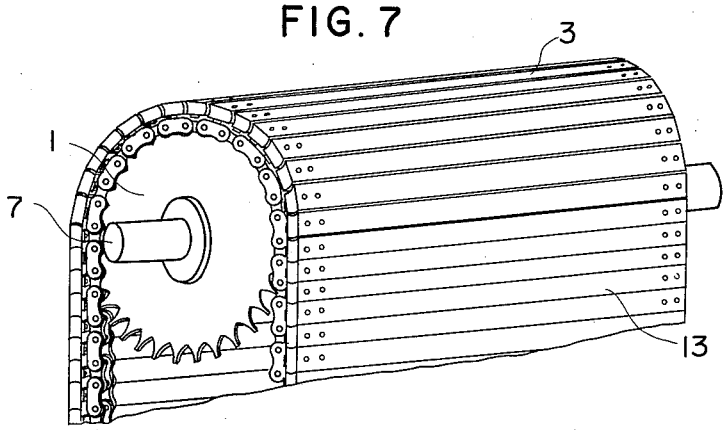
FIG. 8a   FIG. 8
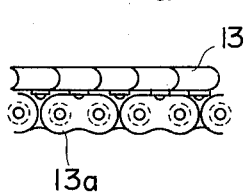 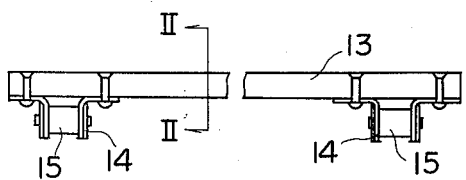
FIG. 9
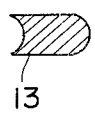
Jyun-ichi Goto
INVENTOR.
BY Wenderoth, Lind & Ponack
ATTORNEYS

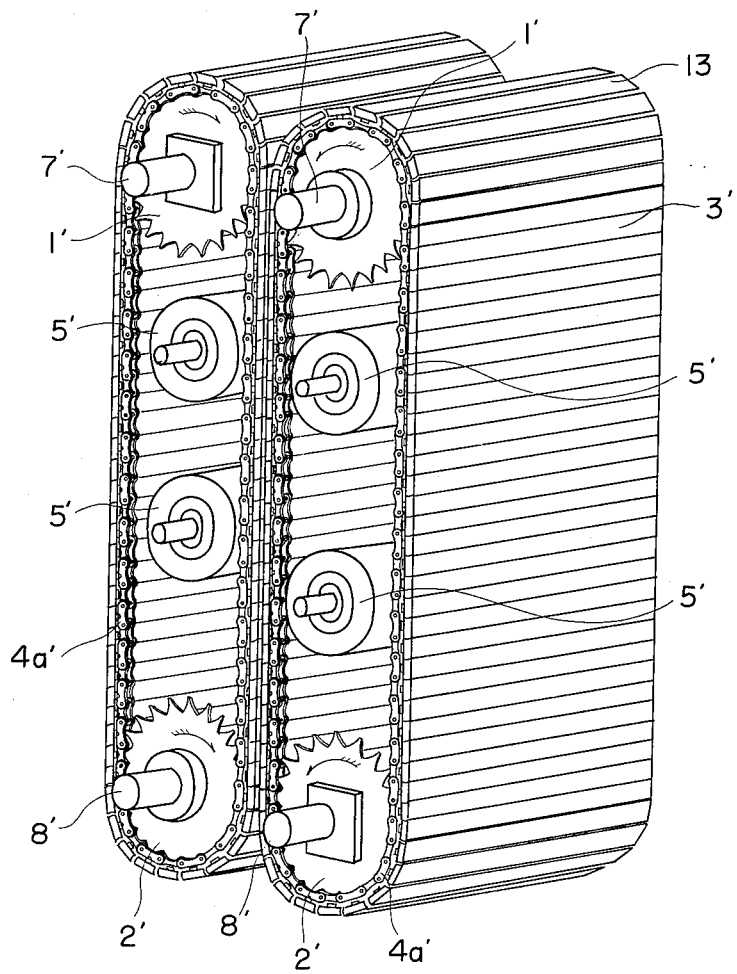

2,981,486
LOW PRESSURE FLOUR MILL

Jyun-Ichi Goto, 519 Ohmiya, Schizuoka,
Fujimiya City, Japan

Filed Dec. 10, 1957, Ser. No. 701,926

Claims priority, application Japan Dec. 24, 1956

2 Claims. (Cl. 241—200)

The present invention relates to an improved process of flour milling, and particularly to a process of wheat flour milling by means of relatively low friction and a relatively low pressure.

In general, the wheat flour of superior quality is the flour free from impurities resulting from the pulverized bran of wheat berry, yet which retains the essential part thereof. The requirements for the production of best quality flour are as follows: (1) the wheat stock should be thoroughly cleaned by removing any foreign matter, (2) neither bran nor cell thereof should be broken, (3) suitable bolting should be employed, and (4) no step should be adopted to destroy the essential part thereof. Of the four requirements hereinabove mentioned, the first and third are satisfactorily met at present, and nothing has been complained of. However, the second and last requirements have never been heretofore fully satisfied.

Flour mills having break rolls consisting of corrugated steel cylinders are extensively used for the present day flour milling. This process of flour milling by break rolls is nothing but crushing wheat stock completely. It may be convenient, but I believe it will not meet the second and last requirements. The flaky pieces of bran should not be pulverized into flour, and at the same time the endosperm cell should not be destroyed.

The conventional grinding operation is carried out on corrugated rolls, known as "break rolls," which are operated in opposite directions at a differential in speed. After bolting, the coarsest material is conveyed to the second break rolls, which are set a little closer together than the first; thus the stock is crushed. Then the crushed stock is sifted and the coarsest material passes through the third "break rolls," and the stock is again sifted. This conventional process of alternately grinding and sifting is repeated until several breaks have been accomplished. At each successive break the rolls are set a little closer together, and more and more endosperm is released and removed by sifting. The material going to each succeeding "break" contains less and less endosperm.

In accordance with the process of flour milling by means of break rolls, the point of contact between break rolls is a linear contact, I think. The linear contact produces a momentary action, therefore the grinding action is so vehement and oppressive that the wheat stock is usually crushed too much. For the purpose of grinding the stock effectively, the high rotary speed and high pressure break rolls are required, so that the increasing heavy weight of the roll in proportion to the high rotary speed thereof and the strong elasticity resulting therefrom should also be taken into consideration. The wheat stock is crushed more and more by means of such a grinding action at high pressure and high friction as used in the prior art.

In conditioning and tempering, a suitable addition of water is made and the wheat is allowed to stand for a sufficient time to secure maximum toughening of the bran with optimum mellowing of the endosperm.

In spite of the modern conditioning process of the wheat stock, the disadvantages of pulverizing the bran and impairing the cell will not be avoided.

In accordance with my invention, the wheat stock is subjected to a suitable conditioning process, then the wheat passes through two elements of my invention. The two elements are the essence of the invention. Two elements correspond to break rolls in function. They are operated in opposite directions at a differential in speed. However, the point of contact between two elements of my invention is constructed in such manner that it may produce a relatively much more spacious area than the area of contact between "break rolls" of conventional apparatus. Consequently, the bran is separated from the endosperm in an effective manner, because the stock which passes through two elements of my invention is not crushed with a vehement and momentary pressure.

The wheat stock is, however, thoroughly crushed by the milling operation of prior art, such as a milling process using break rolls of a corrugated steel cylinder. The wheat endosperm is not only crushed but also the bran itself is crushed, whereas it should be entirely separated from the endosperm. The high speed rotary action of the heavy break rolls crushes and destroys the cell of the wheat. The destruction of the cell should be eliminated in order to retain the flavor of the wheat.

The reason why the bran is pulverized and the cell is damaged by the break rolls may be attributed to the linear contact of break rolls which accompanies a high speed rotary motion at a high attrition under a high pressure resulting from a heavy momentary percussion.

On the other hand, with the relatively spacious contact of two elements of my invention, the pressure imparted to the wheat stock per unit area of contact is much smaller than for the per unit area of linear contact, although the same force as is imparted to the break rolls may be given to two elements. Therefore no vehement attrition of momentary high pressure can take place.

One device in which a relatively spacious contact is carried out may be called "recessed contact," and the other device, "flat and a relatively spacious contact."

A device in which "recessed contact" may be accomplished comprises a hard roll, a Venetian blind like element, and an elastic roll provided within the Venetian blind like element.

The production of flat and spacious contact may be accomplished by providing two Venetian blind like elements face to face, leaving a little space between them, and operating them at a differential in speed and in opposite directions. In the flat and spacious contact process, another Venetian blind like element is used instead of the hard roll in the recessed contact process.

The wheat stock passes between the Venetian blind like elements to be crushed. In the flat and spacious contact process, the contact area is much more spacious than that of the recessed contact, accordingly the pressure imparted per unit area of contact is smaller than that of recessed contact, if the total pressure is assumed to be equal.

A principal object of the invention is to provide an improved process of flour milling in which no change of the physical properties of the wheat endosperm is brought about, and besides, pulverizing of the bran and destruction of the cell are minimized, and accordingly the extraction rate is increased.

Another object of the invention is to provide an improved process of flour milling by which the inherent flavor and nutrient substances of the wheat is retained more abundantly than in any flour milling according to a conventional process.

Other objects and features of novelty will appear as I proceed with the description of two embodiments of the invention which, for the purposes of the present invention, I have illustrated in the accompanying drawings, in which:

Fig. 3 is an enlarged partial and perspective view of the engagement between a sprocket wheel and a link of the apparatus of Fig. 1.

Fig. 6 is a perspective view of an apparatus for carrying out a flat and relatively spacious contact flour milling process.

Fig. 7 is an enlarged partial and perspective view of the engagement between a sprocket wheel and a link of the apparatus of Fig. 6.

Fig. 8 is a side view of a metallic rod having two L pieces of the apparatus of Fig. 6.

Fig. 8a is a partial view, in side elevation, of the chain and elements of the apparatus of Fig. 6.

Fig. 9 is a sectional view of Fig. 8 taken along the line II—II.

Figure 1:
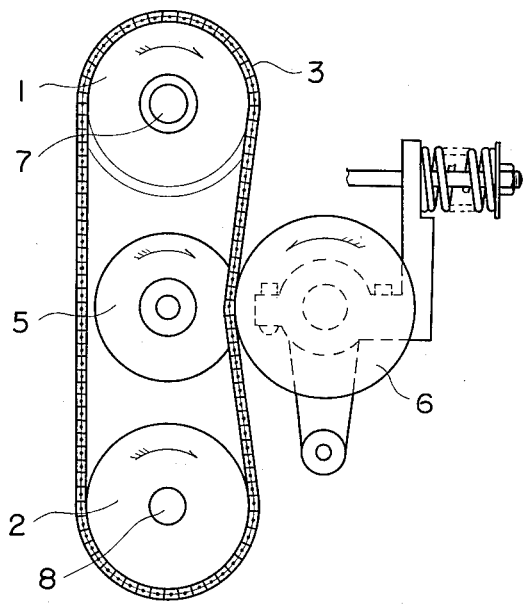
Fig. 1 is a side view of an apparatus for carrying out a recessed contact flour milling process in accordance with my invention.
Figure 2A:
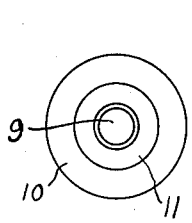
Fig. 2a is an end view of the roll of Fig. 2.
Figure 2:
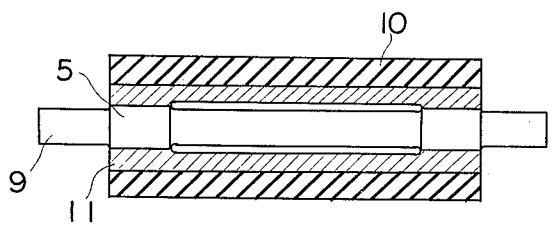
Fig. 2 is a sectional view of an elastic roll of the apparatus of Fig. 1.
Figure 3A:
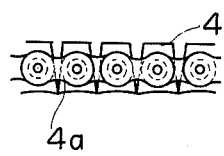
Fig. 3a is a partial view, in side elevation, of the chain and elements of the apparatus of Fig. 1.
Figure 4:
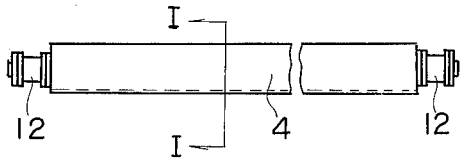
Fig. 4 is a side view of a metallic rod of the apparatus of Fig. 1.
Figure 5:
Fig. 5 is a sectional view of Fig. 4 taken along the line I—I.

Referring to Figs. 1–5 inclusively, a sprocket or toothed wheel 1 having a suitable number of teeth is fixed to either end of a metallic shaft 7 of a suitable size and length. At least two toothed wheels are fixed to the shaft, one at each end, but a plurality of wheels may be provided depending upon the length of the shaft. For the sake of convenience, two wheels are shown in this embodiment. I have invented an endless chain-like element 3 comprising a plurality of metallic slats 4 connected to one another by a sprocket chain 4a which may travel endlessly around the upper shaft 7 and lower shaft 8 with engagement with the sprocket 1 of the upper shaft 7. The sprocket chain 4a for the endless chain-like element 3 engages with the sprocket 1 of the upper shaft 7. The sectional view of the metallic slat 4 is shown in Fig. 5, one edge being concave, the other flat. Each end of the metallic slat is in the form of a stub shaft 12 for insertion into the eye of a chain link of chain 4a. All these slats with their ends inserted into the eye of each link are connected and assembled together in succession, whereby the endless chain like element of my invention is constructed. There is a link at both ends of each rod of the endless chain-like element, which link engages with a projecting tooth of the sprocket 1. With the rotation of the upper shaft 7 connected with two sprockets 1, the endless chain-like element is caused to move endlessly. As shown in Fig. 1, the upper shaft with the sprockets at both ends is provided on the upper part of the machine housing, and a lower guide roll 2 of a suitable material is secured in the bottom of the housing. The endless chain-like element comprising a series of metallic slats on a series of chain links is made to move endlessly around the upper shaft and the lower guide roll.

Within the endless chain-like element, an elastic roll 5 covered with an elastic material such as rubber 10 is pivotally mounted so as to move freely. It is driven by movement of the element 3 thereover.

A hard roll 6 such as an iron roll is provided outside of the endless chain-like element 3 parallel to and in close relationship to the endless chain-like element. The hard roll 6 contacts the endless chain-like element 3, which in turn contacts the elastic roll 5 in order to effect a flour grinding operation, therefore the hard roll 6 and the elastic roll 5 should be placed in an effective manner by adjusting a suitable angle of contact. A device for adjusting the angle of contact is not described here for brevity, because it does not constitute part of my invention.

A wheat stock pretreated with water is put in the hopper above the machine, then charged into the clearance between the endless chain-like element 3 and the hard roll 6. Now the sprocket wheel is made to revolve in the direction of the arrow at the speed of 1.8 meters per second so as to move the endless chain-like element endlessly around the upper and lower shafts, then the elastic roll is moved into contact with the endless chain-like element and the hard roll by movement of the pivot of the elastic roll, accordingly the surface of the elastic roll is pressed in by the pressing force of the hard roll through the endless chain-like element as shown in Fig. 1.

At the same time the hard roll 6 is caused to turn around in the opposite direction, as indicated by the arrow, at the speed of 3.6 meters per second.

From the hopper the wheat stock with a suitable amount of water added thereto falls down into the space between the endless chain-like element and the hard roll. The pressure imparted to the endless chain-like element and the hard roll is adjusted in such a manner that the endosperm cell will not be impaired and the bran will not be pulverized, taking the amount of wheat stock to be ground, the size of stock, and fragments into consideration. The stock passes a relatively spacious area of contact between the endless chain-like element and the hard roll to be crushed due to a differential in speed and movement in the opposite directions, and the bran is separated from the endosperm. This process of recessed contact is particularly suitable for a grinding step by means of break rolls.

The second embodiment of my invention, as shown in Figs. 6–9, is similar to that of the first embodiment, similar parts being designated by primed reference numerals, except that it provides a second endless chain-like element in place of the hard roll 6 in the first embodiment as shown in Fig. 1. The sprocket chain link construction of the endless chain-like element 3' of the second embodiment is different from that of the first embodiment, as is clear from Fig. 8. The links which engage with a sprocket wheel 1' is constructed by providing two L-shaped metallic pieces 14 on both ends of a metallic slat 13 and inserting a pin 15 through the two L-shaped pieces. The endless chain-like element of my invention comprises a series of slats 13 connected together and is supported on the upper shaft 7' having a sprocket wheel 1' and on the lower guide roll 8' so as to form an endless chain 3'.

An elastic roll 5' covered with an elastic material such as rubber is pivotally mounted within the endless chain-like element. The number of elastic rolls to be provided within the endless chain-like element depends upon the degree to which the flour grinding process is to be carried out. I have illustrated two elastic rolls 5' in Fig. 6, but it is to be understood that the invention should not be limited to two. As the elastic roll 5' is pivotally mounted, it is adjustable so it can be moved into close contact with the endless chain-like element in order to effect friction between the two endless chain-like elements at a differential in speed while they are moving in opposite directions. A control device for the elastic roll is not described here, because various conventional devices therefor may be used.

The wheat stock to be ground falls down from the hopper into the space between the two endless chain-like elements as shown in Fig. 6. The section of each metallic slat of the endless chain-like element is as shown in Fig. 9, the one end being concave, the other convex.

Now, let one of the two endless chain-like elements move faster than the other. The one having a convex section in its individual slats towards the direction of movement moves faster than the other having a concave section towards the direction of movement. The elastic rolls 5' are adjusted so that the endless chain-like elements are in close contact with each other. The elastic roll within the fast running endless chain-like element revolves at a similar speed, that is, fast, and, on the other hand, the elastic roll within the slow running endless chain-like element moves slowly. Two elastic rolls come into close contact with two endless chain-like elements between them and accordingly a relatively spacious area of frictional contact is produced between two elements. In this relatively spacious area of frictional contact and at a relatively low pressure, the wheat stock is crushed without a heavy crushing action.

In this embodiment of my invention, the moving speeds of two Venetian blind like elements are two meters and one meter per second. The flat contact grinding process in this embodiment is particularly suitable for middling and sizing processes.

I claim:

1. A wheat flour milling machine comprising a pair of spaced parallel shafts, at least two sprocket wheels on each shaft, a pair of sprocket chains, one over corresponding wheels on each shaft, a plurality of slat elements pivotally mounted between the sprocket chains parallel to the shafts and abutting each other to form an endless belt of elements, each element having a concave surface facing outwardly of said endless belt, means for driving said endless belt, at least one roller having an elastic surface thereon rotatably mounted within said endless belt with the axis of rotation thereof parallel to said shafts and contacted by said endless belt, and a second roller having a hard surface rotatably mounted parallel and opposed to said one roller and bearing against said endless belt and pressing said endless belt against said one roller, and means for driving said second roller faster than said endless belt.

2. A wheat flour milling machine comprising a pair of spaced parallel shafts, at least two sprocket wheels on each shaft, a pair of sprocket chains, one over corresponding wheels on each shaft, a plurality of slat elements pivotally mounted between the sprocket chains parallel to the shafts and abutting each other to form a first endless belt of elements, each element having a concave surface facing outwardly of said endless belt, means for driving said endless belt, at least one roller having an elastic surface thereon rotatably mounted within said endless belt with the axis of rotation thereof parallel to said shafts and contacted by said endless belt, and a second endless belt comprised of a plurality of slat elements each having a flat surface facing outwardly of the belt and mounted for rotation around two axes parallel to the axes of said shafts with one run of said second endless belt parallel to and tangent to a run of said first endless belt, and a roller having an elastic surface rotatably mounted within said second endless belt and opposed to said one roller, said rollers pressing the runs of said endless belts together, and means for driving said second endless belt faster than said first endless belt.

References Cited in the file of this patent

UNITED STATES PATENTS

| | | |
|---|---|---|
| 234,122 | Fredenhagen | Nov. 9, 1880 |
| 251,217 | Gray | Dec. 20, 1881 |
| 258,867 | Raymond | May 30, 1882 |
| 408,618 | Herr | Aug. 6, 1890 |
| 817,382 | Merrill | Apr. 10, 1906 |
| 871,176 | McCargar | Nov. 19, 1907 |
| 1,064,352 | Lingle | June 10, 1913 |
| 1,704,823 | Denny | Mar. 12, 1929 |
| 2,007,910 | Stephens | July 9, 1935 |
| 2,021,376 | Pierce | Nov. 19, 1935 |
| 2,379,677 | Borsakovsky | July 3, 1945 |
| 2,509,418 | Brown | May 30, 1950 |

FOREIGN PATENTS

| | | |
|---|---|---|
| 509,131 | Belgium | July 31, 1953 |